Dec. 9, 1941.  C. R. WOOTEN  2,265,710
ADVERTISING DEVICE
Filed July 7, 1937  7 Sheets-Sheet 1

INVENTOR
Carrol R. Wooten
BY
ATTORNEYS

Dec. 9, 1941.   C. R. WOOTEN   2,265,710
ADVERTISING DEVICE
Filed July 7, 1937   7 Sheets-Sheet 3

INVENTOR
Carrol R. Wooten
BY
ATTORNEYS

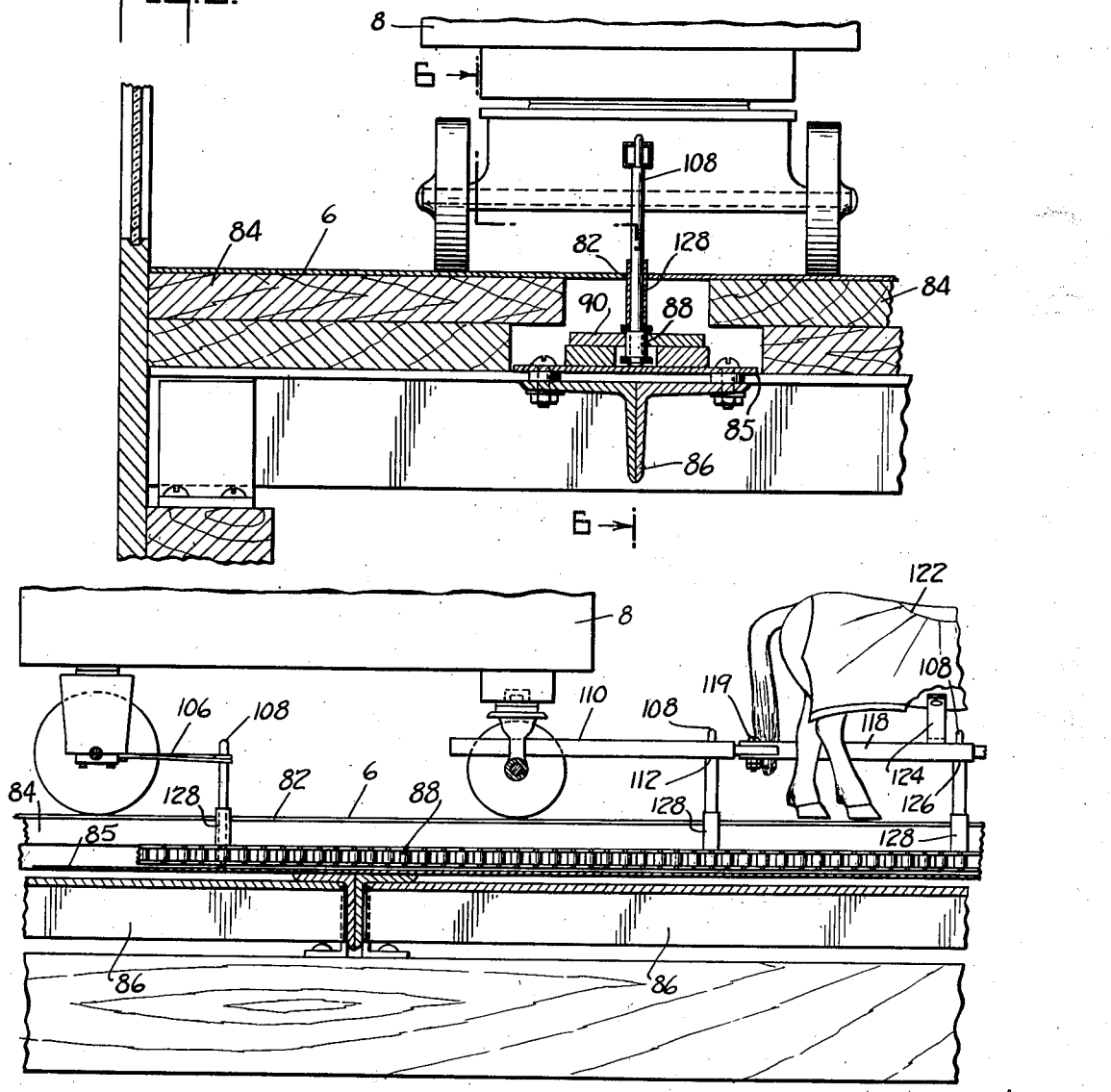

Dec. 9, 1941. C. R. WOOTEN 2,265,710
ADVERTISING DEVICE
Filed July 7, 1937 7 Sheets-Sheet 5

INVENTOR
Carrol R. Wooten
BY
ATTORNEYS

Dec. 9, 1941.   C. R. WOOTEN   2,265,710
ADVERTISING DEVICE
Filed July 7, 1937   7 Sheets-Sheet 6

INVENTOR
Carrol R. Wooten
BY
ATTORNEYS

INVENTOR
Carrol R. Wooten
ATTORNEYS

Patented Dec. 9, 1941

2,265,710

UNITED STATES PATENT OFFICE 2,265,710

ADVERTISING DEVICE

Carrol R. Wooten, New York, N. Y., assignor to Beech-Nut Packing Company, Canajoharie, N. Y., a corporation of New York Application July 7, 1937, Serial No. 152,345

2 Claims. (Cl. 46—122)

The present invention relates to advertising devices and has special reference to advertising devices that are in simulation of a circus, and has for its object to provide a novel and improved device of this character.

The several features of the invention will be readily understood from the following description and accompanying drawings, in which:

Fig. 5 is a transverse sectional elevation, taken on the line 5—5 of Fig. 4;

Fig. 6 is a sectional elevation, taken substantially on the line 6—6 of Fig. 5;

Figure 1:
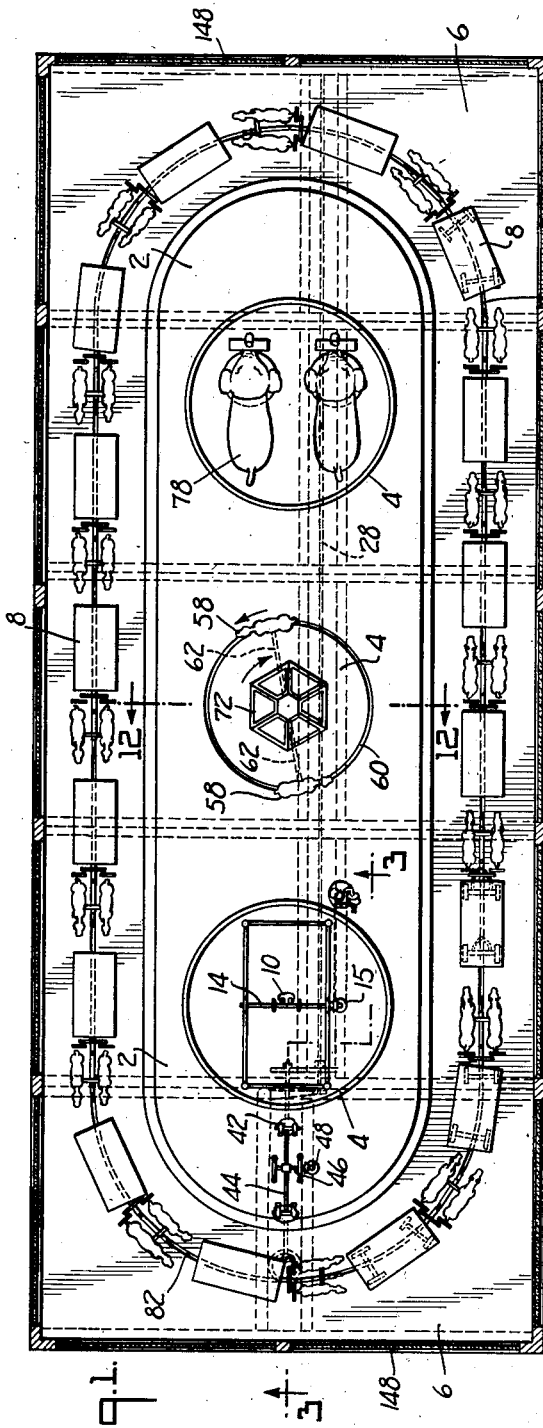
Figure 1 is a sectional plan view, partly diagrammatical of an advertising device embodying features of the invention in their preferred form.
Figure 2:
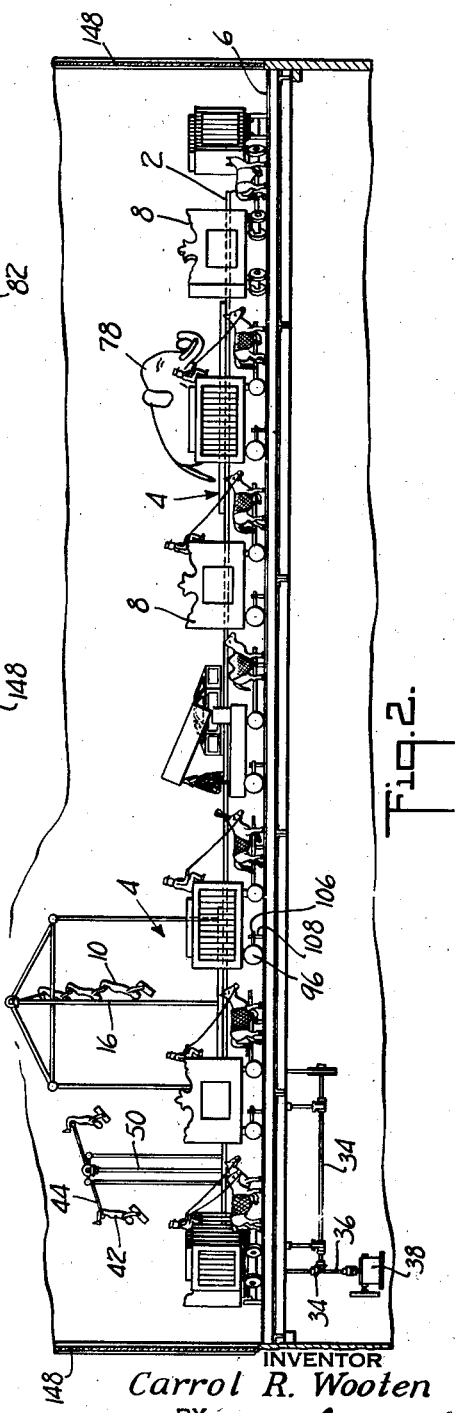
Fig. 2 is a side elevation, partly in section and with parts broken away to save space.

My improved device as illustrated in the drawings, comprises a platform 2 having a plurality of rings 4 thereon in simulation of the rings of a circus. Surrounding the platform 4 and spaced a distance below the level thereof is a support 6 which serves as a track upon which vehicle sets 8 are mounted to travel in parade formation about the platform.

Figure 3:
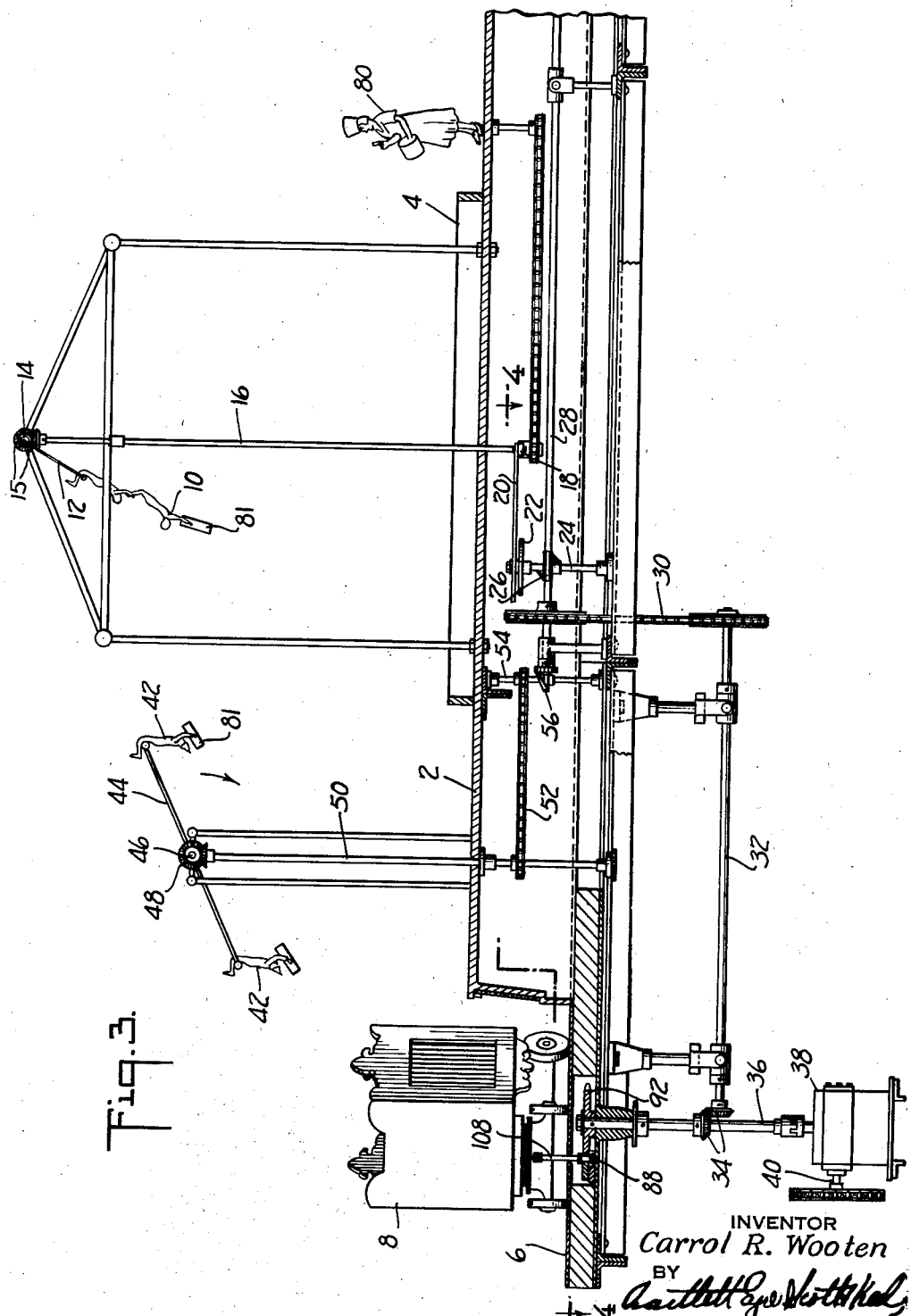
Fig. 3 is a sectional elevation on an enlarged scale, taken substantially on the line 3—3 of Fig. 1.

Any suitable toy figures may be arranged in the rings 4 and caused to operate in simulation of circus performers. In the left-hand end ring 4, trapeze performers 10 are shown on a trapeze 12 that is carried by a shaft 14 which is mounted to oscillate to swing the performers about the axis thereof. As shown the shaft 14 is oscillated through miter gears 15 and a vertical shaft 16 (Fig. 3). The shaft 16 is actuated through an arm 18 on the lower end thereof (Fig. 4) and a link 20 connecting the arm with a crank disc 22 secured on a shaft 24 mounted beneath the platform. The shaft 24 is rotated by a belt 26 that passes over pulleys on the shaft 24 and a horizontal shaft 28. The latter shaft 28 is driven by a sprocket chain 30 which passes over a sprocket wheel thereon and a sprocket wheel on a shaft 32 which is driven through miter gears 34 by a shaft 36. This shaft 36 is driven through suitable chain speed gears enclosed within a casing 38 and a drive shaft 40.

To the left of the end ring 4 there are shown figures 42 on the ends of an oscillating bar 44 carried by a rock-shaft 46 that is actuated through miter gears 48, a vertical shaft 50, a sprocket chain 52 which passes over a sprocket wheel on the shaft 50 and a sprocket wheel on a shaft 54. The shaft 54 is driven through a belt 56 which passes over a pulley thereon and a pulley on the end of the shaft 28.

Figure 12:
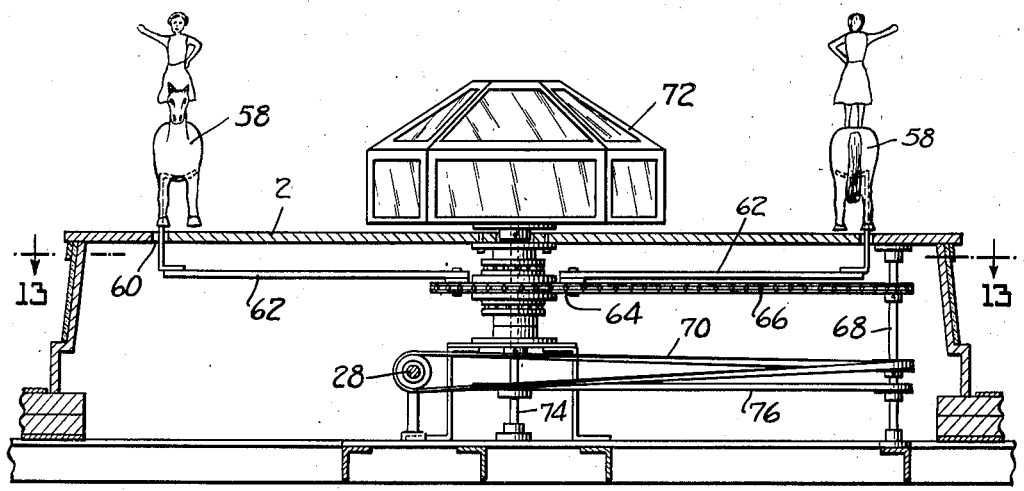
Fig. 12 is a sectional view on an enlarged scale, taken substantially on the line 12—12 of Fig. 1.
Figure 13:
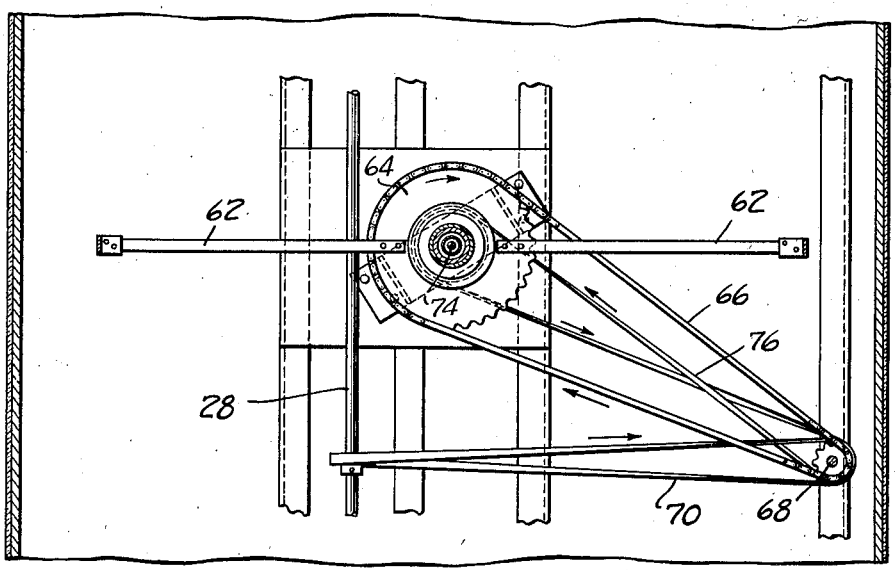
Fig. 13 is a sectional plan view, taken substantially on the line 13—13 of Fig. 12.

In the center circus ring is shown two figures 58 in the form of horses which are arranged above an annular slot 60 in the platform (Figs. 1, 12 and 13). The figures 58 are carried on the ends of arms 62, having their outer ends projecting upwardly through the slot 60, and their inner ends secured on the top side of a disk 64 that is in the form of a sprocket wheel driven by a chain 66 that passes over a sprocket wheel on a shaft 68. The shaft 68 is driven by a belt 70 that passes over pulleys on the shaft 68 and on the shaft 28. By this mechanism the horses 58 are caused to travel about the center ring 4.

In the center of this center ring there is shown a display device 72 which is secured on the upper end of a shaft 74 that passes through the shaft that carries the disk or sprocket wheel 64, the latter shaft being hollow. This shaft 74 is driven through a belt 76 that passes over a pulley on shaft 74 and a pulley on shaft 68. By this driving means the display device 72 is caused to rotate in the opposite direction to the travel of the horses 58.

Similarly through connection with the shaft 28, the figures 78 in the right-hand ring and various figures about the ring such as the girl 80 may be caused to perform.

The figures in the rings and about the rings may be used to display various packaged products such as packages 81 of fruit drops and chewing gum as shown, and also advertising matter may be carried by the display device 72 of the center ring.

The support or track 6 may be made of sheet metal having a continuous slot 82 surrounding the platform and spaced therefrom (Fig. 5). The sheet metal track may be supported by beams 84 as shown. Directly beneath the slot 82 there is supported a plate 85 on angle irons 86. On the plate 85 rests an endless sprocket chain 88 directly beneath the slot 82. This chain is held from lateral movement on the support 85 by means of guides 90, having their inner edges arranged adjacent the sides of the chain.

Figure 4:
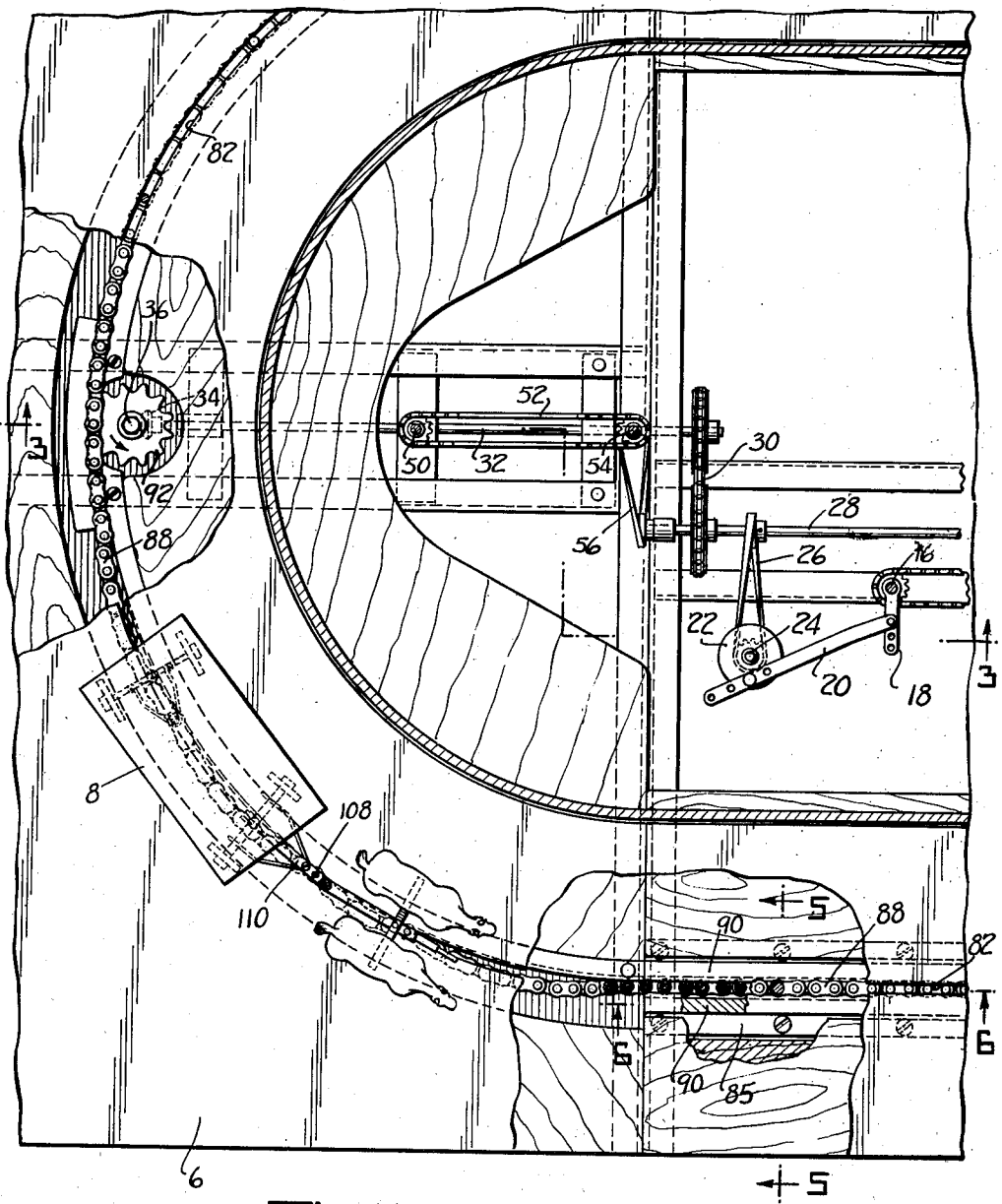
Fig. 4 is a sectional plan view on an enlarged scale, taken substantially on the line 4—4 of Fig. 3.

The outer guide 90 is omitted for the portion of the chain that passes around the curved ends of the platform as shown in Fig. 4.

The chain 88 is actuated so as to cause it to travel about the platform by a sprocket wheel 92 which is secured on the upper end of the drive shaft 36.

Figure 7:
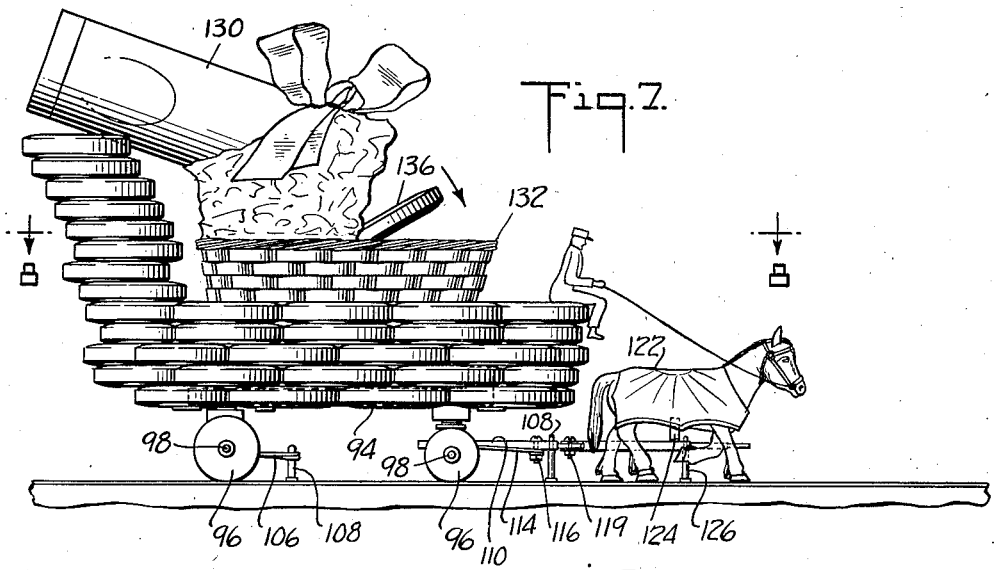
Fig. 7 is a side elevation of one of the sets of the circus of the advertising device which is in the form of a horse-drawn vehicle.
Figure 8:
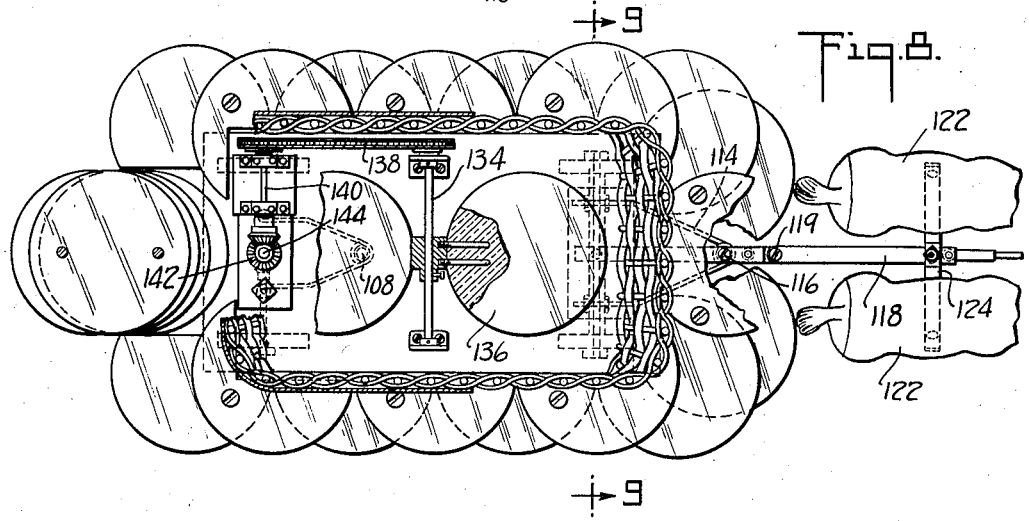
Fig. 8 is a sectional plan view, taken on the line 8—8 of Fig. 7.
Figure 9:
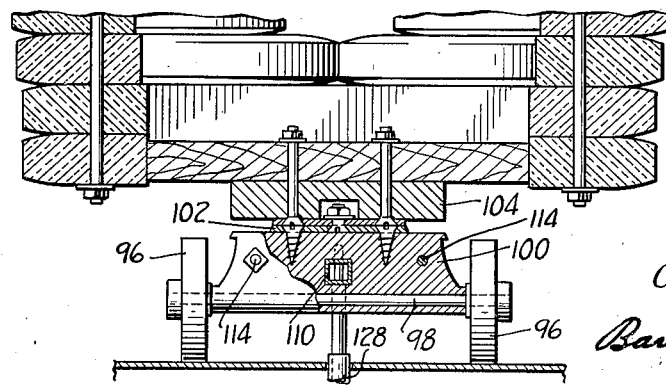
Fig. 9 is a sectional view taken on the line 9—9 of Figs. 8 and 10.

The sets 8 as shown, are in the form of horse-drawn vehicles, and are propelled about the track through connection with the chain 88. Each set may consist of a body 94 that is provided with wheels 96 (Fig. 7). Each pair of wheels 96 is mounted on an axle 98. Each of the axles 98 extends through an axle housing or block 100 which is connected with the underside of the vehicle body through a swivel connection 102.

Associated with the rear axle are two drag links 106 which have their rear ends secured to the underside of the axle housing or block 100. The forward ends of said links 106 are provided with apertures which loosely receive the upper end of one of a series of pins 108.

At the front of the vehicle there is a vehicle shaft or bar 110 which extends through an aperture in the axle housing or block 100 and its forward end is pivoted on one of the upper ends of one of the pins 108, the forward end of the shaft resting upon a shoulder 112 on this pin. This front axle housing or block 100 has associated therewith drag links 114 which have their rear ends secured to the axle housing 100 at points spaced a distance from the vertical center thereof and have their forward ends pivoted on a screw or bolt 116 secured to the vehicle shaft 110 slightly back of the associated pin 108. The vehicle shaft 110 has an extension 118 which is pivotally connected through a pivot bolt 119 with a short bar 120 secured in the end of shaft 110. The forward portion of this shaft extension 118 extends between the horses 122 and supports said horses by means of a cross bar 124 secured thereto and having its outer ends secured to the horses, the horses hoofs slightly clearing the track 6.

The forward end portion of the shaft extension 118 is pivoted on the upper end of one of the pins 108 and rests upon a shoulder 126 thereon.

Each of the pins 108 forms an extension of one of the pivot pins between adjacent links of the chain 88. To assist in maintaining the pins 108 in upright position, each of them is provided with a rotatable sleeve 128 thereon that is arranged closely adjacent the walls of the slot 82.

With this construction upon the chain being driven the pins 108 carried thereby through the drag links 106 and 114 causes the vehicle sets 8 to travel therewith on the track. As the vehicle travels around the curved end portions of the track, the front and rear wheel axles are free to turn so as to maintain the wheels substantially parallel with the track and thus prevent lateral sliding movement of the wheels and vehicle.

The connection between the horses and pin 108 associated therewith support the horses slightly above the track.

In the vehicle set illustrated in Figs. 7 to 11, the vehicle body 94 carries a member 130 which simulates in appearance a package of fruit drops of the usual kind in which the fruit drops are in the form of disks or wafers arranged in stacked relation and enclosed by paper and foil wrappers. As shown the member 130, which may be made of sheet metal is inclined downwardly and rearwardly and its forward or lower end is open and simulates the open end of a fruit drop package which has been torn open. Beneath said open end of the package there is a receptacle, the upper portion of which is in the form of a basket 132. Mounted within this receptacle is a shaft 134 which is arranged horizontally transversely thereof. This shaft carries disks or wafers 136 in simulation of fruit drops. There are shown six such members 136 and they are radially arranged about the axis of the shaft.

Figures 10, 11:
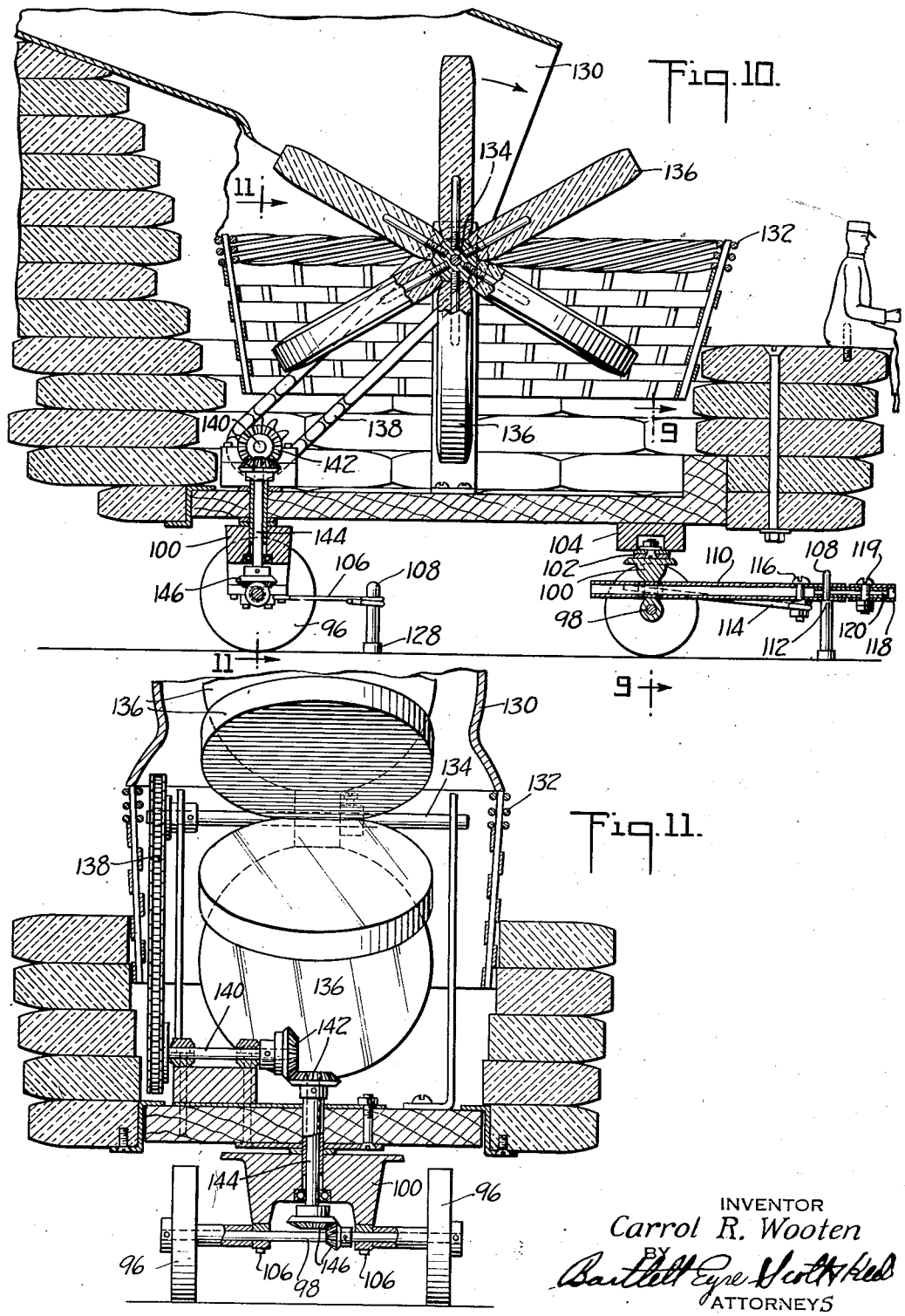
Fig. 10 is a longitudinal sectional view on an enlarged scale of a portion of the vehicle illustrated in Fig. 7.
Fig. 11 is a transverse sectional view, taken substantially on the line 11—11 of Fig. 10.

Upon rotating the shaft 134 in a clockwise direction, viewing Fig. 10, the members 136 give the appearance of fruit drops discharged one by one from the package and into the basket 132.

As shown the shaft 134 is thus driven through connection with the rear axle of the vehicle body. This connection comprises a sprocket chain 138 which passes over sprockets on the shaft 134 and a shaft 140 in the lower portion of the vehicle body. The shaft 140 is driven through miter gears 142, a shaft 144, and mita gears 146, one of which is carried by the rear axle of the vehicle. As the rear wheels 96 of the vehicle are rotated as the vehicle is pulled along the track by the sprocket chain 88, the fruit drop members 136 are rotated as above described.

It will be apparent that instead of the shaft 134 being driven by the axle of the vehicle body, it may be driven by other means and thus the device by itself may be used for example as a window display.

Figures and devices carried by other vehicle sets in the parade may be operated in a manner similar to the set illustrated in Figs. 7 to 11.

The entire device may be enclosed in a truck or trailer body or in a stationary enclosure, the device being viewed through windows 148 which form a casing for the device. When in operation the performing figures in the circus rings, about the rings and in the parade, and the movement of the vehicle sets about the platform, accompanied by a transcription of a circus band, give a remarkably life-like simulation of a ring circus. Both the performers on the platform and the track which is dropped below the platform may be easily viewed. Also, it will be noted that the figures give an opportunity to display simulations of various products, such as chewing gum, candy and other packaged products.

As will be evident to those skilled in the art, my invention permits various modifications without departing from the spirit thereof or the scope of the appended claims.

What I claim is:

1. In a device of the class described, the combination of a platform having a plurality of rings thereon in simulation of the rings of a circus, figures in simulation of circus performers arranged in said rings, an endless track surrounding and spaced a distance below the level of the platform, figures arranged on said track about the platform in simulation of a circus parade, and means for propelling the last-mentioned figures along said track and for operating the figures in the circus rings, the upper portions of said figures on the track projecting above the level of the platform so as to be visible when viewed across the platform.

2. In a device of the class described an endless track having a slot extending longitudinally thereof, a plurality of toy vehicles arranged on said track in parade formation, each of said vehicles comprising a vehicle body, front and rear axles, wheels on the ends of the axles resting on the track, and a swivel joint between each of said axles and the vehicle body, an endless flexible member arranged beneath the track, means for driving the flexible member, pins carried by said flexible member extending upwardly through said slot, each of said pins being spaced a distance in front of one of the axles, and drag links having their forward ends pivotally connected with each of said pins and having their rear ends connected with said axle at points arranged at opposite sides of the longitudinal center of the axle.

CARROL R. WOOTEN.